United States Patent [19]
Gerike

[11] 4,173,894
[45] Nov. 13, 1979

[54] PORTABLE TEMPERATURE SENSING DEVICE

[76] Inventor: Andy Gerike, 133 Richmond St. West, Toronto, Ontario, Canada, M5H 2L7

[21] Appl. No.: 910,498

[22] Filed: May 30, 1978

[51] Int. Cl.² ............................................. G01K 1/16
[52] U.S. Cl. .................................................. 73/362.8
[58] Field of Search .............................. 73/362.8, 374

[56] References Cited
U.S. PATENT DOCUMENTS

| | | | |
|---|---|---|---|
| 2,293,276 | 8/1942 | Brown et al. | 73/362.8 X |
| 2,302,640 | 11/1942 | Schmidt | 73/374 |
| 3,157,049 | 11/1964 | Stahlberg | 73/362.8 |
| 3,344,669 | 10/1967 | Roedder | 73/362.8 |
| 3,483,752 | 12/1969 | Rogen et al. | 73/362.8 |
| 3,851,529 | 12/1974 | Andrews | 73/362.8 |

Primary Examiner—S. Clement Swisher

[57] ABSTRACT

The specification describes a portable temperature sensing device adapted to maximize heat transfer from a selected location on a planar surface to the device while minimizing heat transfer from surrounding conditions. The device includes a frame made of thermal insulating material provided with a sealed cavity, a temperature measuring instrument in the sealed cavity, a heat transfer member having a high thermal conductivity and extending from the cavity to the exterior surface of the frame for intimate contact with the planar surface, and means for reading the temperature measuring instrument. The arrangement is such that the heat transfer member is essentially isolated from thermal effects of surrounding conditions when the device is in use.

4 Claims, 3 Drawing Figures

PORTABLE TEMPERATURE SENSING DEVICE

FIELD OF THE INVENTION

The following invention relates to a portable temperature sensing device particularly designed to determine the temperature of a selected area on a planar surface.

BACKGROUND OF THE INVENTION

In recent years, the increasing costs and shortage of heating fuels have initiated great concern regarding the effectiveness of insulation used in homes, cottages, office buildings and the like. Persons occupying these structures are particularly concerned with unusually high heat losses through walls, floors, ceilings, and any other insulated surfaces. However, since the insulation is provided as a backing to the surface, it is highly difficult if not impossible to visually determine locations of poor or no insulation. Furthermore, a "touch" or "feel" method of determining areas of high heat loss is very inaccurate and at best, will only indicate a general area of heat loss. As can be appreciated, this is not adequate since the addition of further insulation requires tearing down and rebuilding of the surface and in order to minimize the amount of wall to be torn down an exact location must be determined.

It would appear that the best method of finding areas of poor or no insulation is to accurately determine the inner wall, ceiling or floor surface temperature at a specific location and to compare that temperature to other accurately measured temperatures for other specific locations on the inner surface of the wall, ceiling or floor. However, this method requires the use of a portable temperature sensing device including temperature sensing means which is isolated from the ambient room temperature for measuring the temperature of a specific location. Presently available thermometers and the like do not have this feature, and any temperature reading provided by them is obviously adversely influenced by surrounding temperatures.

The present invention provides a portable temperature sensing device for measuring the temperature of a specific location on a planar surface while minimizing the thermal effects of surrounding conditions. The device comprises a thermally insulated frame, a thermally conductive heat transfer member extending from the exterior of the frame to a sealed cavity within the frame, a temperature measuring instrument in the cavity in contact with the heat transfer member and means for reading said temperature measuring instrument. The heat transfer member is adapted for intimate contact with a planar surface and the arrangement is such that the heat transfer member is essentially isolated from the thermal effects of the surrounding conditions by the insulated frame when the device is in use.

The invention provides a method of appraising the insulating properties of the material backing a selected area. The device allows the user to determine whether temperature variances exist across the surface and also to compare the temperatures of various different surfaces to determine the surface of greatest heat loss per unit area assuming equal outside conditions.

BRIEF DESCRIPTION OF THE DRAWINGS

Preferred aspects of the present invention are shown in the attached drawings wherein.

DETAILED DESCRIPTION OF THE PREFERRED EMBODIMENTS ACCORDING TO THIS INVENTION

Figure 3:
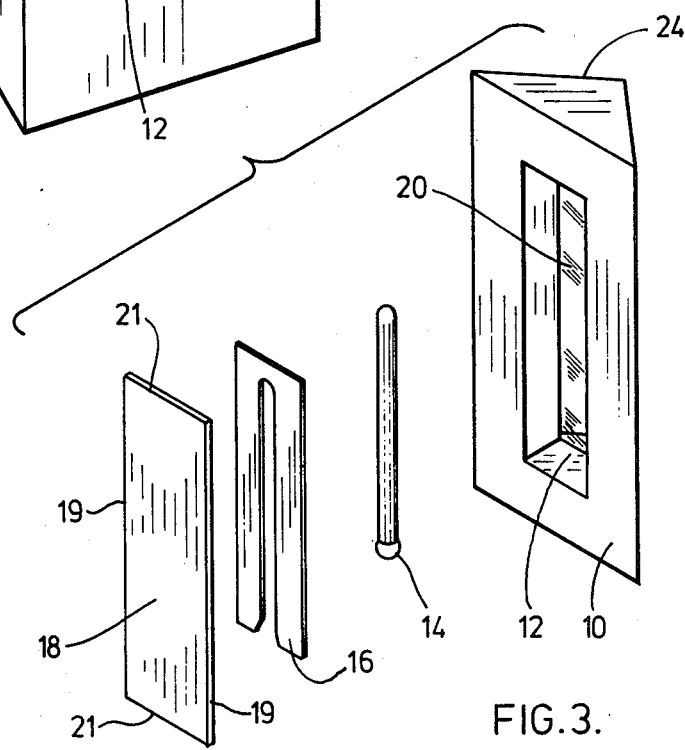
FIG. 3 is an exploded view of the device shown in FIGS. 1 and 2.

Referring to FIG. 3, a preferred arrangement of the temperature sensing device includes thermometer 14, metallic heat transfer plate 18, scale 16, and frame 10 made of high thermal resistant material such as styrofoam, rubber, and the like. Frame 10 is provided with an interior cavity 12, which is sealed from the front side by window member 20 and from the rear by heat transfer plate 18.

Since thermometer 14 is secured to the heat transfer plate, the heat transfer to the thermometer is made by conduction. The sealing of cavity 12 provides a dead air space or thermal insulating barrier between the outside environment and the thermometer and in combination with the thermally resistant material of the frame, minimizes heat transfer from the surroundings to the thermometer. The area of thermal contact between the device and the surface is defined by the rear surface area of the metallic plate presenting a planar heat transfer face. Furthermore, any heat transferred to the thermometer, other than that passing through the metallic heat transfer plate, is transferred by means of convection thereby maximizing the excellent insulation properties of the dead air space.

Figure 2:
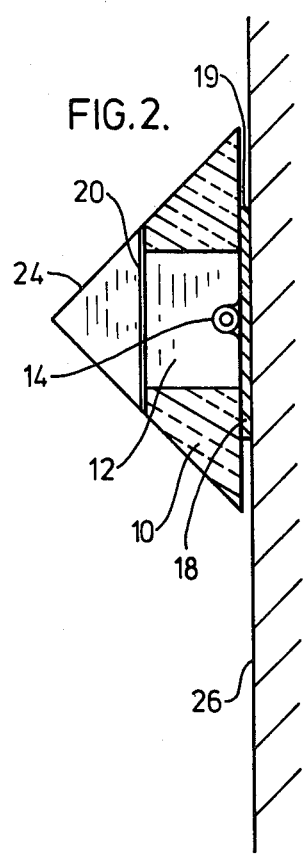
FIG. 2 is a cross sectional view taken along lines 2—2 of FIG. 1 showing the device in position for measuring the temperature of a planar surface.

As can be seen from FIG. 2, the device is particularly useful for accurately measuring the surface temperature of a small area on planar surface 26 with metal heat transfer plate 18 intimately contacting the desired area on the surface. As can be appreciated from he Figure, metal plate 18 is essentially isolated to the desired area. The only portions of the plate which are exposed to the ambient room temperature are sides 19 and ends 21 of the plate. However, the resiliency of the frame allows the user to apply pressure on the frame such that it deforms about the plate to contact the wall about the outer periphery of the plate to effectively complete the isolation of the plate. This in combination with the high thermal conductivity and the thinness of the metallic plate assure a small response time which is generally less than two minutes so that an entire wall, floor, or ceiling surface can be checked very quickly.

In certain situations, it may be more desirable to leave the device at one location for an extended period. In order to assure maximum isolation in such circumstances, side and end edges 19 and 21 of plate 18 may be coated with suitable thermal resistant material such as sealant, glue, or the like. With this arrangement, the frame need not be deformed to complete the isolation of the metallic plate.

Figure 1:
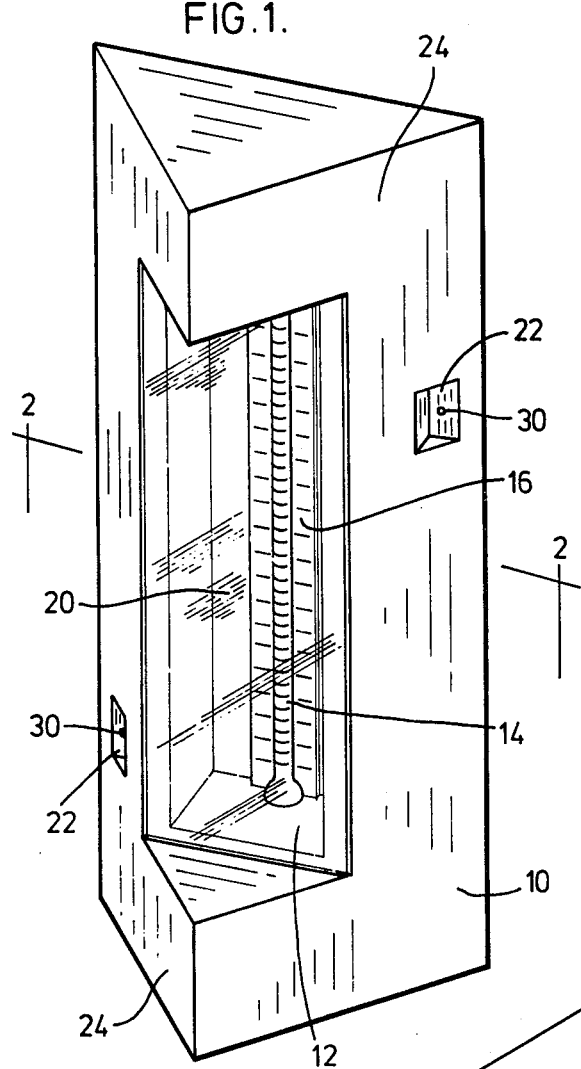
FIG. 1 is a perspective view of a preferred assembled unit according to the present invention.

As best shown in FIG. 1, the frame has been additionally provided with cut-out portions 22 and apertures 30 for use with securing means (not shown) for holding it in position over the extended periods. Apertures 30 permit the use of tacks or pins for holding the device to surfaces made from material such as grass cloth. Cut-out portions 22 are adapted for use with suctions cups used for securing the device to hard surfaces such as painted walls and doors.

With the arrangement shown in the drawings, angled portions 24 of the frame have been covered with a relatively non-cohesive material, such as a hard plastic which permits the use of any conventional tape material for securing the device to a desired surface. It has been discovered that the triangular shape of the frame shown in the drawings is especially useful when using tape as the securing medium, because there are no abrupt corners between the frame and the surface and the tape will effectively cling to both the device and the supporting surface. When the tape is no longer effective, it is simply peeled off the frame and replaced by a new piece of tape. The relatively poor cohesive properties of the material covering frame portions 24 assure ease of peeling.

A further method of completely isolating the metallic plate to a desired location and from the ambient room temperature, is to countersink the plate such that its outer surface is flush with the flat rear surface of the frame. This arrangement is useful for either a quick reading or a reading in which the device is secured to the surface over an extended period.

In order to increase the accuracy of the device, the thermometer could be calibrated and appropriately designed to provide temperature readings ranging from 10° to 25° C., the minimum and maximum temperatures which would be recorded in an occupied dwelling.

Other more complicated temperature reading instruments may be provided. For example, the device may be provided with a digital read-out visible through the transparent window. According to another arrangement, the transparent window is eliminated and the device is provided with thermocouple means and an outlet probe for use with a separate visual read-out connectable to the probe.

As will be appreciated from the above description, the present invention has been adapted to provide a highly accurate temperature reading of a selected small area on the inner surface of a wall, ceiling floor, and the like by providing an intimate isolated contact between the small surface area and the metallic heat transfer plate. Therefore, by taking various temperatures on the planar surface and comparing those temperatures, areas of poor or no insulation can be determined. Through the use of the device, the exact location of cold spots can be determined so that one need not tear down an entire surface to add the desired insulation. Furthermore, because the device is portable with a short response time, the user can quickly and accurately measure the temperature at various locations and determine which surface is most in need of insulation. The nature of the device and the materials from which it is constructed make it very inexpensive and available to the average home owner. The resiliency of the frame and the provision of the heat transfer plate make it possible to exert high pressure on the device to isolate the plate without damaging the thermometer tube.

Although various preferred embodiments of the invention have been described herein in detail, it will be appreciated by one skilled in the art that variations may be made thereto without departing from the spirit of the invention or the scope of the appended claims.

What I claim is:

1. A temperature sensing device adapted to maximize heat transfer from surrounding conditions comprising a frame of thermal material provided with a sealed cavity, a temperature measuring instrument in said sealed cavity operable over a range of temperatures, a thin metal heat transfer plate having a high thermal conductivity extending from said cavity projecting slightly beyond the exterior surface of said frame for presenting a planar heat transfer face for intimate contact which such planar surface and means for reading said temperature measuring instrument and being adapted to provide readout over said range of temperatures, said temperature measuring instrument being in contact with said heat transfer plate, said planar heat transfer face defining the area of thermal contact with such planar surface, said thin metal plate occupying a major portion of the surface area of said exterior surface of said frame for maximizing heat transfer to said temperature measuring instrument and for minimizing response time of said temperature sensing device; said frame being resilient for deformation about said plate to essentially isolate it from thermal effects of surrounding conditions when in use.

2. A portable temperature sensing device adapted to maximize heat transfer from a selected location on a planar surface to the device while minimizing heat transfer from surrounding conditions, comprising a frame made of thermal insulating material provided with a sealed cavity operable over a range of temperatures, a thin metal heat transfer plate having a high thermal conductivity and extending from said cavity, and projecting slightly beyond the exterior surface of said frame and presenting a planar heat transfer face for intimate contact with a planar surface and means for reading said temperature measuring instrument and being adapted to provide a temperature readout over said range of temperatures; said temperature measuring instrument being in contact with said heat transfer plate, said planar heat transfer face defining the area of thermal contact with such planar surface, said thin metal plate occupying a major portion of the surface area of said exterior surface of said frame for maximizing heat transfer to said temperature measuring instrument and for minimizing response time of said temperature sensing device, said thin metal plate being coated with a thermal insulating material at its end and side edges to essentially isolate said plate from thermal effects of surrounding conditions when in use.

3. A portable temperature sensing device as claimed in claim 11 wherein said frame is provided with triangular portions adapted to releasably engage adhesive tape to secure said device to such planar surface.

4. A portable temperature device as claimed in claim 3, wherein said frame is provided with triangular portions adapted to releasably engage adhesive tape to secure said device to such planar surface.

* * * * *